US006254966B1

(12) United States Patent
Kondo

(10) Patent No.: US 6,254,966 B1
(45) Date of Patent: Jul. 3, 2001

(54) INFORMATION RECORDING MEDIUMS, SUPPORTER USED IN THE MEDIUMS, MANUFACTURE METHODS OF THE SUPPORTER, MANUFACTURING APPARATUS OF THE SUPPORTER AND STAMPERS FOR PRODUCING THE MEDIUMS

(75) Inventor: Tetsuya Kondo, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/366,663

(22) Filed: Aug. 3, 1999

(30) Foreign Application Priority Data

Aug. 4, 1998 (JP) .................................................. 10-220166
Sep. 18, 1998 (JP) .................................................. 10-264363
Jan. 26, 1999 (JP) .................................................. 11-016850

(51) Int. Cl.$^7$ ....................................................... G11B 7/24
(52) U.S. Cl. ......................... 428/156; 428/64.2; 428/64.3; 428/64.4; 428/694 TR; 360/135; 369/277; 369/284; 369/280
(58) Field of Search ........................... 360/135; 428/156, 428/64.2, 64.3, 64.4, 694 TR; 369/277, 284, 280

(56) References Cited

U.S. PATENT DOCUMENTS 3,627,330 * 12/1971 Dimitracopoulos ................. 274/41.4

5,999,512 * 12/1999 Furuta ............................... 369/275.1

FOREIGN PATENT DOCUMENTS 60-147946 * 8/1985 (JP) .
6-290496 10/1994 (JP) .
10-92032 4/1998 (JP) .

OTHER PUBLICATIONS

"1998 National Convention Record", Inst. of Elec. Engs. of Japan (pp. S.10–25–S.10–28), Mar. 3, 1998: Title: S.10–7 "High–Density Magneto–Optical Recording With Domain Wall Displacement Detection", Authors: Shiratori et al.*

* cited by examiner

Primary Examiner—William P. Watkins, III
(74) Attorney, Agent, or Firm—Anderson, Kill & Olick, P.C.

(57) ABSTRACT

An information recording medium and a supporter used for the information recording medium capable of recording a land/groove recording by using a high density recording technique such as a super-resolution, resulting in a high density recording. An information recording medium B has a supporter 1A, on which a recording layer 5 is formed. On the supporter 1A, lands 2 and groove 3 are alternately formed as a minute track pattern. A crevice 4 having a depth Dc larger than a depth Dg of the respective grooves 3 is formed in the respective grooves 3 at one end of the respective grooves 3 in a width direction of the respective grooves.

14 Claims, 13 Drawing Sheets

Fig. 8
| W1 | Wg | Dg | Wc | Dc |
|---|---|---|---|---|
| 0.55 μm | 0.51 μm | 0.20 μm | 0.04 μm | 0.35 μm |
Fig. 9
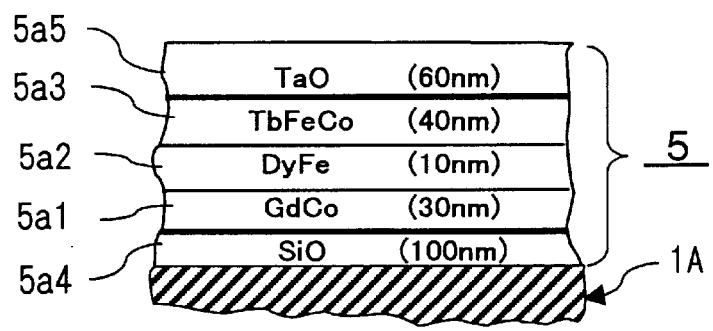
Fig. 10
| W1 | Wg | Dg | Wc | Dc |
|---|---|---|---|---|
| 0.51 μm | 0.51 μm | 0.20 μm | 0.04 μm | 0.35 μm |
Fig. 11
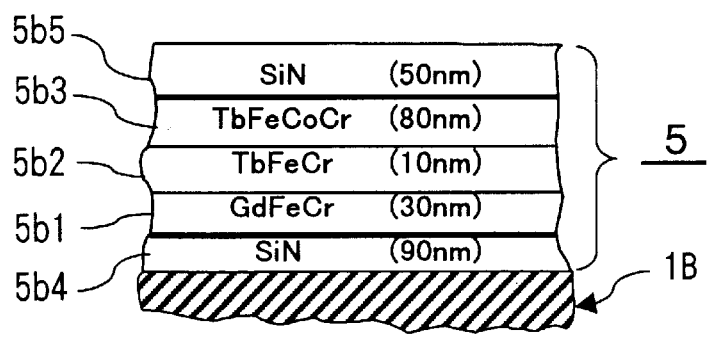

Fig. 22
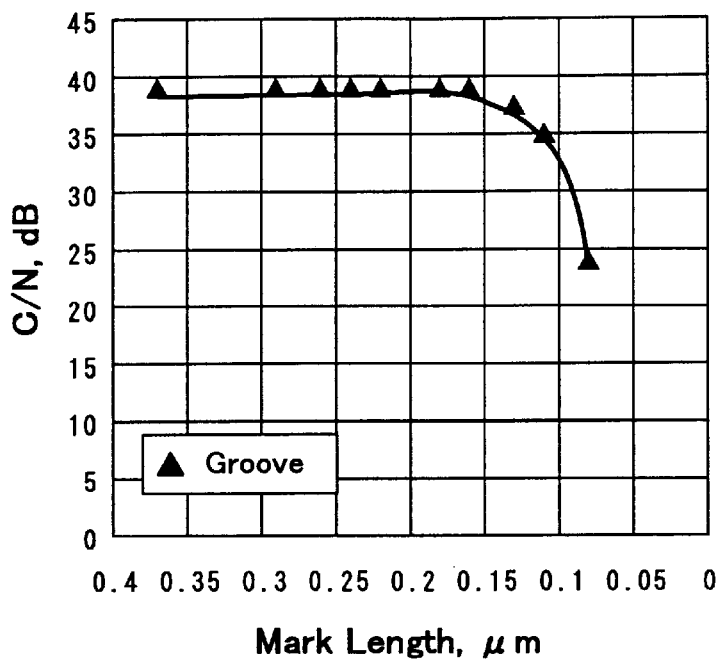
Fig. 23
| W1 | Wg | Dg | Wc | Dc |
|---|---|---|---|---|
| 0.51 μm | 0.51 μm | 0.06 μm | 0.04 μm | 0.10 μm |
Fig. 24
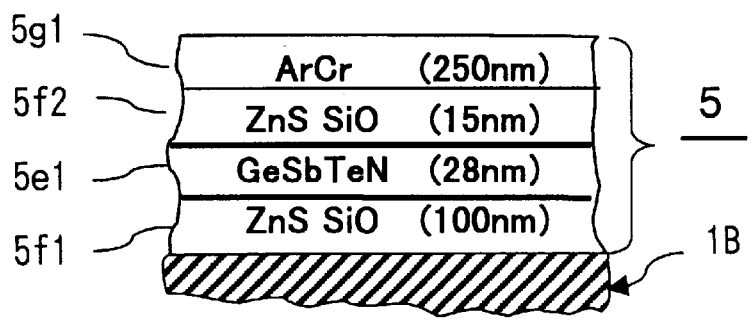

Fig. 25

|        | J1   | J2   | J3   |
|--------|------|------|------|
| Groove | 6.9% | 7.2% | 7.5% |
| Land   | 7.4% | 7.6% | 8.0% |

Fig. 26

|        | J1   | J2    | J3    |
|--------|------|-------|-------|
| Groove | 6.7% | 13.4% | 24.0% |
| Land   | 7.5% | 11.5% | 16.5% |

INFORMATION RECORDING MEDIUMS, SUPPORTER USED IN THE MEDIUMS, MANUFACTURE METHODS OF THE SUPPORTER, MANUFACTURING APPARATUS OF THE SUPPORTER AND STAMPERS FOR PRODUCING THE MEDIUMS

BACKGROUND OF THE INVENTION

1. Field of the Invention

The present invention relates to information recording mediums such as discs, cards and tapes utilizing light or magnetization for recording/reproducing an information recording signal on/from the mediums, particularly, related to information recording mediums suitable for recording/reproducing type recording mediums utilizing magneto-optical or phase change phenomenon, support members (supporters) used for forming a recording layer of the medium thereon, manufacturing methods and apparatuses for manufacturing the supporters, and stampers for producing the mediums.

2. Description of the Related Arts

In the field of optical discs in the prior arts, there are recording/reproducing type discs such as a MD (mini disc) capable of recording music information and a DVD (digital versatile disc)-RAM capable of recording data. Further, recently, in even the field of floppy discs, which were only utilized in magnetic recording in the prior art, there has been developed an optical floppy disc. As a typical example, there has been developed an optical floppy referred to as a supper-disc employing an optical tracking. Furthermore, in the field of the cards in the prior art, the magnetic card was a main stream of the cards. Recently, however, an optical card is beginning to be seen in the market. Further, in even the field of the magnetic tapes there have been developed not only magnetic tapes but also optical tapes.

As mentioned above, the optical techniques are not a monopoly on the disc type information recording mediums but are applied to all kinds of recording mediums having various shapes. In any cases, the developments of the recording mediums are forwarded to realize a high recording density and large capacity recording.

In order to realize a high density recording of the optical disc, there are utilized optical techniques such as a super-resolution reproducing techniques and a land/groove recording technique. However, many problems are pointed out in these techniques, resulting in constraints on realizing a further high recording density.

Next, a description is given of an example of the super-resolution reproducing, i.e., a DWDD (Domain Wall Displacement Detection) type information recording medium and its problems.

Specifically, the DWDD type information recording medium refers to magneto-optical information recording medium such as a magneto-optical disc and a magneto-optical cards, wherein on a supporter member (referred to as a supporter hereinafter) a recording layer and a protection layer are laminated in this order. The recording layer comprises a displacement layer having a small wall coercivity, a switching layer having a relatively lower Curie temperature Ts and a memory layer having a relatively large wall coercivity, resulting an exchange-coupling triple-layered magnetic film known as a super-resolution layer.

Upon reproducing, when the recording layer is heated by being locally irradiated with a laser beam thereon, a temperature gradient is developed in the recording layer. This temperature gradient causes force to drive the domain wall of the displacement layer against the wall coercivity thereof in the higher temperature direction because the wall energy decreases as the temperature increases. When the domain wall of the displacement layer is located in a region where the temperature is lower than the temperature Ts, the domain wall can not be displaced due to the large frictional force from the memory layer through the exchange coupling acting between the displacement layer and the memory layer through the switching layer. However, along with the laser beam movement, when the domain wall is transferred into a region where the temperature is higher than the temperature Ts, the exchange coupling between the displacement layer and the memory layer through the switching layer is disappeared because the magnetization of the switching layer is vanished, and as a result, the domain wall in the displacement layer is solely displaced in the higher temperature direction. The domain wall displacement in the displacement layer is developed each time when a domain wall which is formed at an interval corresponding to an information signal, reaches the isothermal line of the Ts.

In other words, as the recording medium is scanned at a constant speed by using the laser beam, this domain wall displacement mentioned above occurs at a time interval corresponding to a spatial interval of the recorded domain wall. Thus, the information recording signal is reproduced by detecting magnetic reversals associated with the domain wall displacement by using a conventional magneto-optical system irrespective of the resolution of an optical readout system used in the apparatus.

FIG. 5 is a schematic sectional view of a supporter used in an information recording medium in the prior art, and FIG. 6 is a schematic sectional view of an information recording medium employing the supporter shown in FIG. 5 in the prior art.

FIG. 5 shows a supporter 7 used for a DWDD type information recording medium, and FIG. 6 shows the DWDD type information recording medium employing the DWDD type supporter 7 shown in FIG. 5 on which a recording layer 5 and a protection layer 6 are laminated in this order.

Referring to FIG. 5, on the supporter 7 there are formed optical tracking grooves (referred to as grooves hereinafter) 3 having a flat bottom, as a minute track pattern. For example, in a case where the supporter 7 is used for a disc-type information recording medium such as an optical disc, the grooves 3 are formed circularly or spirally. And, between adjacent grooves 3, there is formed a flat hill referred to as a land 2. As shown in FIG. 6, on a plane of the supporter 7 formed with the land 2 and the grooves 3, there are formed a recording layer 5 and a protection layer 6, resulting in an information recording medium A. The recording layer 5 is made of a super-resolution magneto-optical layer, for instance, a triple-layered film composed of a displacement layer made of GdFeCr, a switching layer of TbFeCr and a memory layer of TbFeCoCr.

In order to derive the excellent characteristics from this recording layer to a maximum, the recording layer 5 may be interposed between subsidiary dielectric layers. Here, the recording layer including the subsidiary layers is designated as the recording layer 5. The protection layer 6 is provided for protecting the recording layer 5, and is made of a thick resin layer made of an ultraviolet curing resin or a heat curing resin.

As to a principle of the DWDD, it is explained in detail in 1998 National Convention Record, the Institute of Electrical Engineers of Japan, S. 10-7 (page, S. 10–25 to 28). Thus, a detailed explanation thereof is omitted here for simplicity. However, it should be noted that an information signal is recorded on either a group of the lands 2 or a group of the grooves 3. At that time, either the group of the lands 2 or the group of the grooves 3 is made to be a non-magnetic area and the other is made to be a magnetic area. One of the most significant points to realize the DWDD reproducing is that a designed super-resolution phenomenon is never developed as far as both the group of the lands 2 and the group of the grooves 3 are made to be the magnetic area. In other words, the DWDD is not developed in the information recording medium A shown in FIG. 6 as it is. Thus, it is necessary to convert a part of the magnetic area into a non-magnetic area corresponding to non-recording tracks by continuously heating the part of the magnetic area with a laser beam from a recording/reproducing pickup at a higher power than that used in the recording.

FIG. 7 is a schematic sectional view showing a state where the lands of the DWDD type information recording medium shown in FIG. 6 are annealed, wherein the grooves 3 are made to be recorded tracks and the lands 2 are made to be non-magnetic tracks.

Specifically, before recording an information signal on the grooves 3, the magnetic area of the lands 2 is converted into a non-magnetic area by continuously scanning the lands 2 with the laser beam at a higher power L than that used in the recording. This process is referred to as a laser annealing process hereinafter. In FIG. 7, a hatched portion represents an annealed portion. Thus, the magnetic coupling between the lands 2 and the grooves 3 are disconnected, resulting in a DWDD type information recording medium 40. After the laser annealing process, it is possible to record/reproduce an information signal on/from the grooves 3, resulting in a development of the super-resolution phenomenon in the reproducing. This means that it is possible to read out a recorded information signal having a signal length smaller than that of the optically readable minimum signal length which is calculated by using both a wavelength of a laser beam and a numerical aperture of an objective lens used in the reproducing process.

The DWDD technique mentioned above is an excellent super-resolution recording/reproducing technique in principle, however, there is no alternative but the laser annealing to disconnect the magnetic coupling between the lands 2 and the grooves 3. This fact causes a problem of poor mass-productivity of the information recording medium. For instance, it takes a long time of 30 to 90 minutes for the laser annealing process because every track has to be scanned with the laser beam. Further, there is a theoretical problem that it is impossible to record an information signal on both the lands 2 and the grooves 3 because it requires an alternate construction of the magnetic area and the non-magnetic area. Thus, such a land/groove recording as utilized in a DVD-RAM can not be realized, resulting in a limitation to realize a large capacity recording.

SUMMARY OF THE INVENTION

Accordingly, it is a general object of the present invention to provide an information recording medium in which the above disadvantages have been eliminated.

It is a more specific object of the present invention to provide information recording mediums capable of recording information signals on both lands and grooves and having a large recording capacity and a high mass-productivity without the laser annealing process, supporters used for the information recording mediums, manufacturing methods for the supporters, manufacturing apparatus for the supporters and stampers for producing the information recording mediums.

It is another object of the present invention to provide an information recording medium for recording an information signal thereon comprising: a supporter on which lands and grooves are alternately formed as a minute track pattern, a crevice, at least, formed in the respective grooves, the crevice having a depth larger than that of the respective grooves, and a recording layer formed on the supporter.

It is still another object of the present invention to provide an information recording medium for recording an information signal thereon comprising: a supporter on which lands and grooves are alternately formed as a minute track pattern; two crevices formed in the respective grooves nearby both ends of the respective grooves in a width direction of the respective grooves, the two crevices having a depth larger than that of the respective grooves, and a recording layer formed on the supporter.

It is a further object of the present invention to provide an supporter used for forming a recording layer of an information recording medium thereon, wherein lands and grooves are alternately formed in the supporter as a minute track pattern, and, at least, one crevice having a depth larger than that of the respective grooves is formed in the respective grooves.

It is a still further object of the present invention to provide an supporter used for forming a recording layer of an information recording medium thereon, wherein lands and grooves are alternately formed in the supporter as a minute track pattern, and two crevice having a depth larger than that of the respective grooves, are formed in the respective grooves nearby both ends thereof in a width direction of the respective grooves.

It is another object of the present invention to provide a manufacture method of an supporter used for forming a recording layer of an information recording medium thereon comprising the steps of: forming a patterning mask having an dry-etching proof on a support member polished in high precision and cleaned; forming a pattern corresponding to the minute track pattern on the patterning mask on the support member; forming the grooves and the crevice at the same time by a dry-etching method under a gas pressure of 35 to 500 mtorr; and, removing the patterning mask remained.

A further object of the present invention is to provide a manufacture apparatus for manufacturing a supporter used for forming a recording layer of an information medium thereon, wherein the manufacture apparatus has means for simultaneously forming grooves and crevices in the supporter according to a minute track pattern formed thereon by dry-etching.

A still further object of the present invention is to provide a stamper used for producing a supporter for forming a recording layer of an information recording medium thereon, wherein lands and grooves are alternately formed on the stamper, and a crevice having a height larger than that of the respective grooves is, at least, formed in the respective grooves.

Another object of the present invention is to provide a manufacturing method of a supporter for forming a recording layer of an information recording medium thereon, comprising the steps of forming a glass master, producing a stamper from the glass master and forming the supporter with the stamper, wherein the glass master forming process comprises the steps of: forming a patterning mask having a dry-etching proof on a support base polished in high precision and cleaned; forming a pattern corresponding to a minute track pattern on the patterning mask formed on the support base; forming grooves and crevices in the support base at the same time according the pattern by dry-etching under the gas pressure of 35 to 500 mtorr; and removing the patterning mask remained from the support base.

BRIEF DESCRIPTION OF THE DRAWINGS

FIG. 8 is a chart showing dimensions of constructive parts of the support shown in FIG. 1;

FIG. 9 is a section of a recording layer for explaining a concrete lamination structure of the recording layer in the present invention;

FIG. 10 is a chart showing dimensions of constructive parts of the supporter of the second embodiment shown in FIG. 3:

FIG. 11 is a section of another recording layer for explaining a concrete lamination structure of the recording layer in the present invention;

FIG. 22 is a graph showing a mark length vs C/N reproduction frequency characteristic on a groove recording of an information recording disc in the present invention;

FIG. 23 is a chart showing concrete dimensions of the surface shape of the supporter in the present invention;

FIG. 24 is a section showing a recording layer for explaining other concrete laminated structure of the recording layer in the present invention.

FIG. 25 is a chart showing measurement values of jitter on the land/groove recording in the present invention; and FIG. 26 is a chart showing measurement values of jitter on the land/groove recording in the prior art.

Through the drawings, like parts are designated with like reference characters, and a detailed description thereof is omitted for simplicity.

DETAILED DESCRIPTION OF THE PREFEREED EMBODIMENTS

Description is given in detail of embodiments of information recording mediums of the present invention, supporters used for the information recording mediums, manufacturing methods for the supporters, manufacturing apparatuses for the supporters and stampers for producing the information recording mediums in the present invention.

Figure 1:
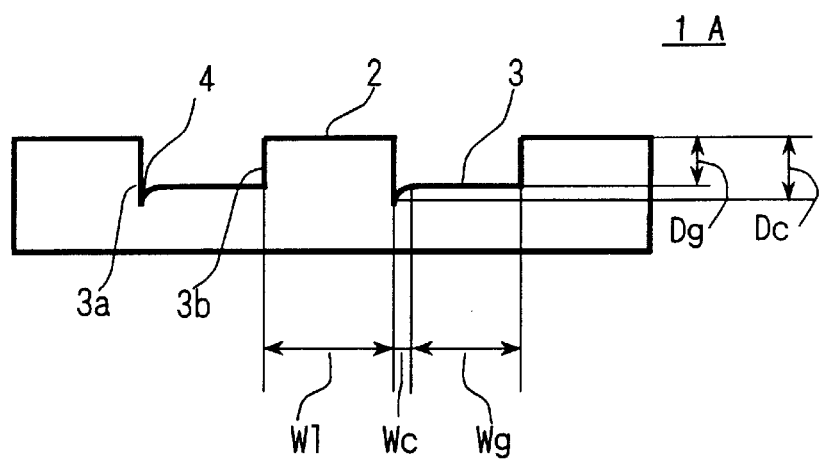
FIG. 1 is a schematic sectional view of a supporter of a first embodiment used for an information recording medium in the present invention.
Figure 2:
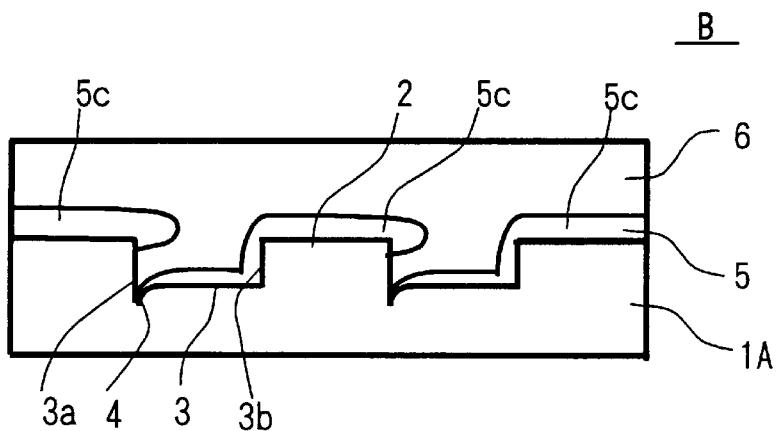
FIG. 2 is a schematic sectional view of an information recording medium of a first embodiment in the present invention.
Figure 3:
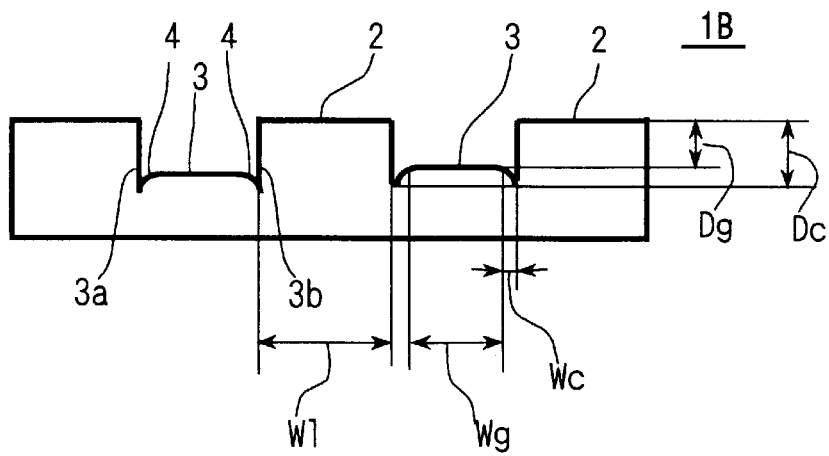
FIG. 3 is a schematic sectional view of a supporter of a second embodiment used for an information recording medium in the present invention.
Figure 4:
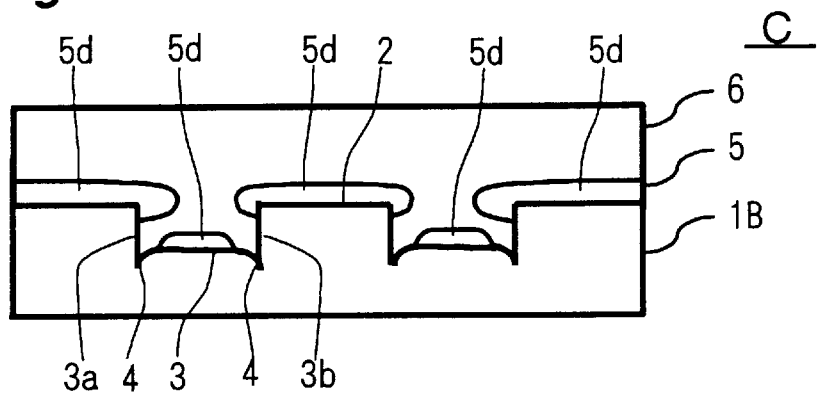
FIG. 4 is a schematic sectional view of an information recording medium of a second embodiment in the present invention.
Figure 15:
FIGS. 15 (a) to 15 (e) are schematic sectional views for explaining a manufacturing process of the supporter of a first embodiment shown in FIG. 1 in the present invention.
Figure 15:
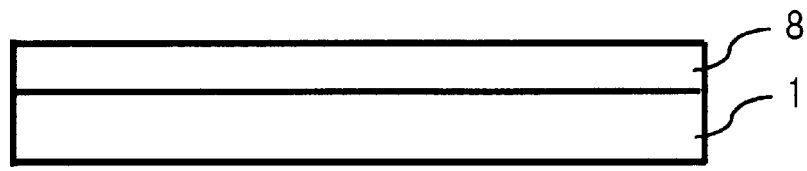
Figure 15:
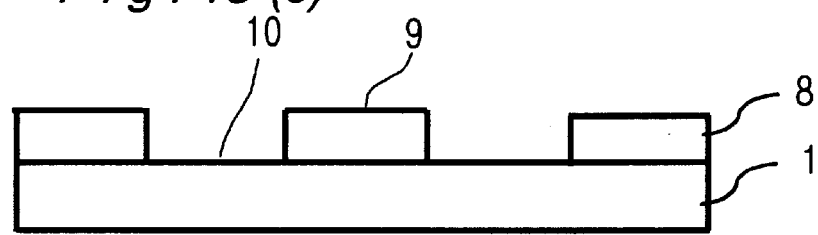
Figure 15:
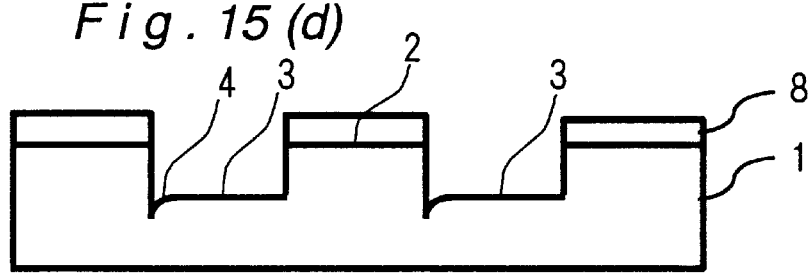
Figure 15:
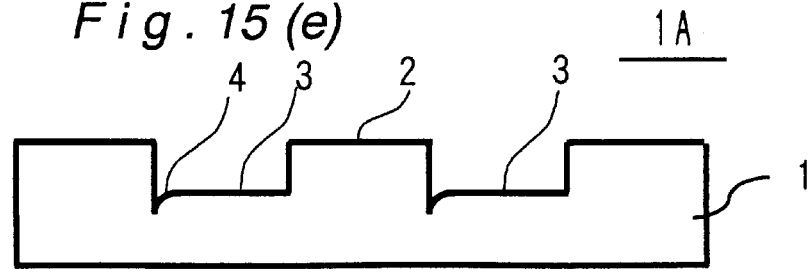
Figure 16:
FIGS. 16 (a) to 16 (e) are schematic sectional views for explaining a manufacturing process of the supporter of the second embodiment shown in FIG. 3 in the present invention.
Figure 16:
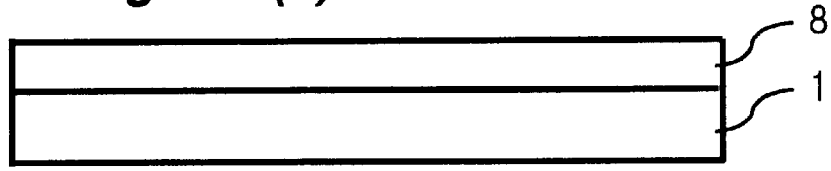
Figure 16:
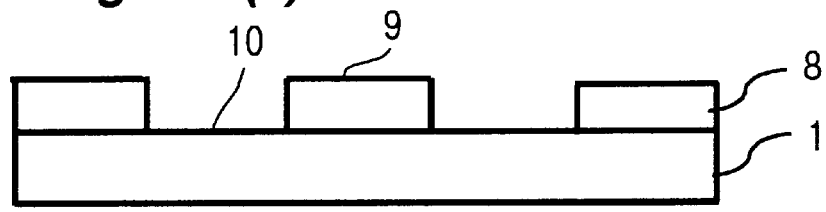
Figure 16:
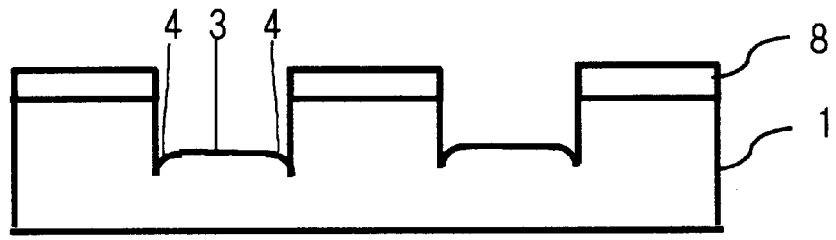
Figure 16:
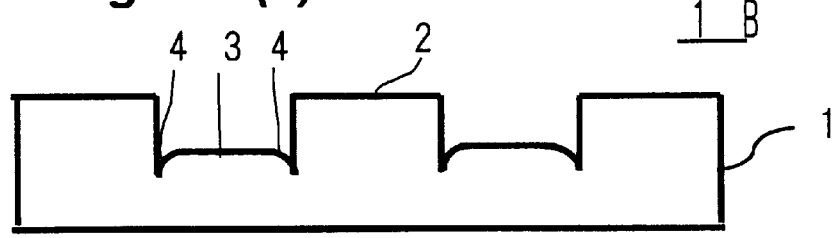
Figure 17:
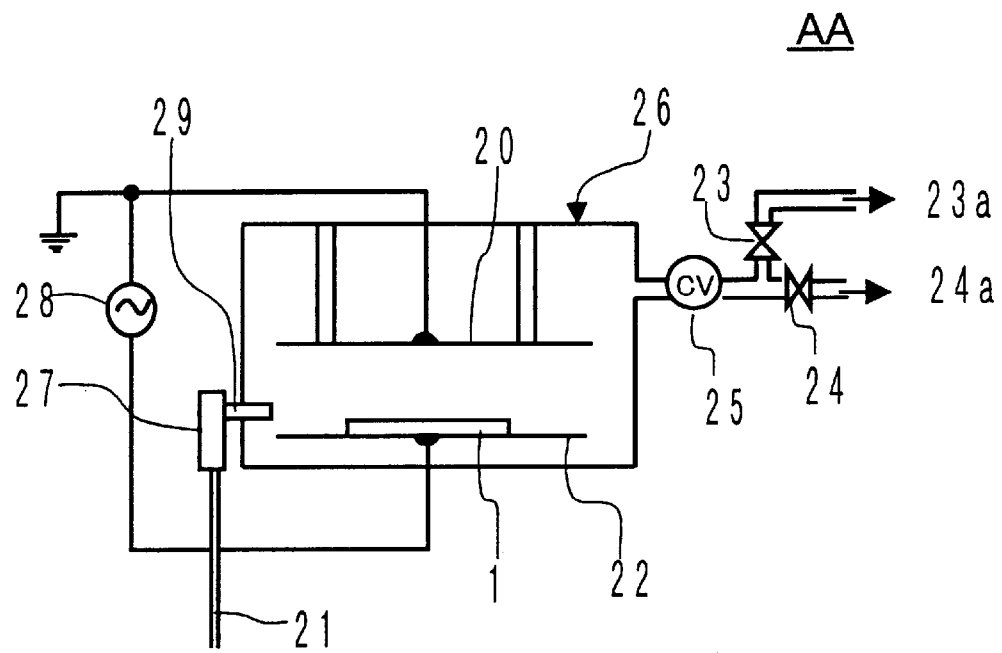
FIG. 17 is a schematic view for explaining a structure of a dry etching apparatus used in the manufacturing process of the supporter.
Figure 18:
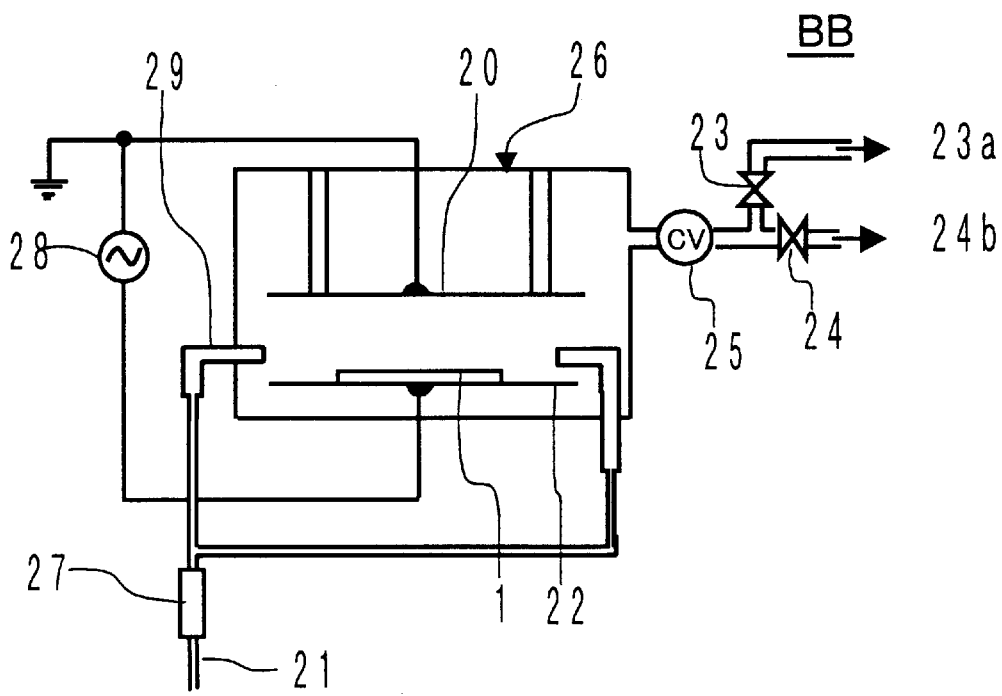
FIG. 18 is a schematic view for explaining a structure of another dry etching apparatus used in the manufacturing process of the supporter.
Figure 19:
FIGS. 19 (a) to 19 (i) are schematic sectional views for explaining a manufacturing process of the supporter of a third embodiment 3 in the present invention.
Figure 19:
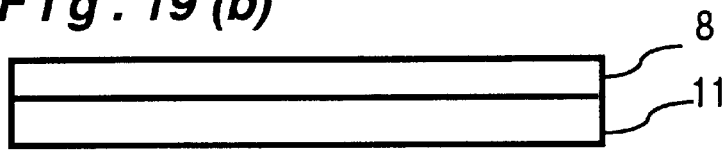
Figure 19:
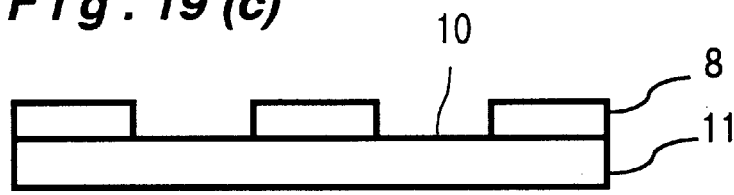
Figure 19:
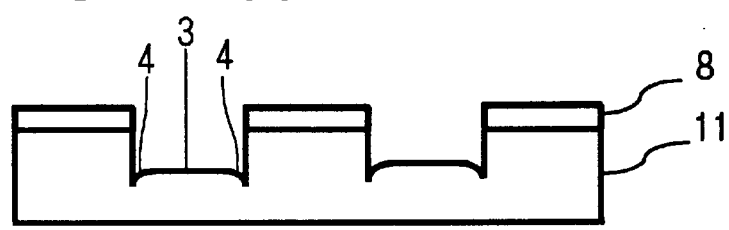
Figure 19:
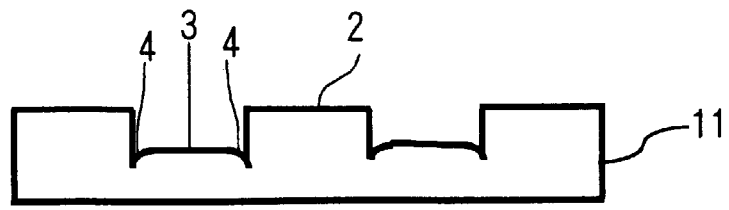
Figure 19:
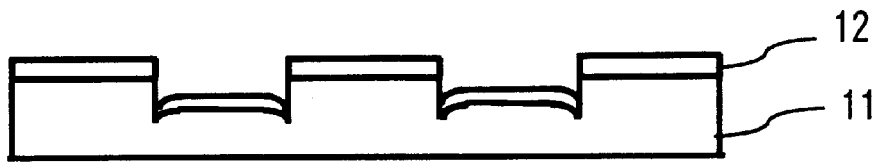
Figure 19:
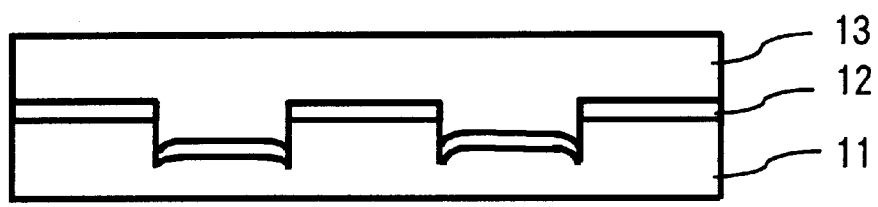
Figure 19:
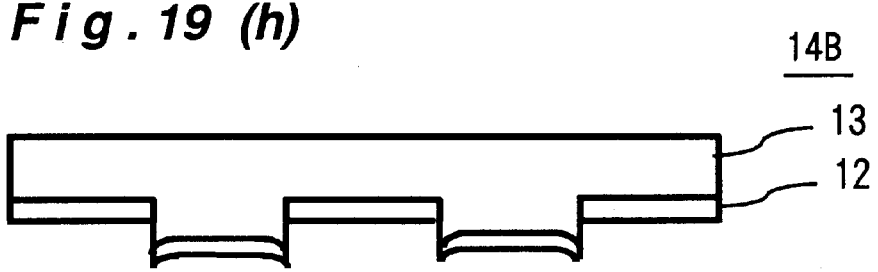
Figure 19:
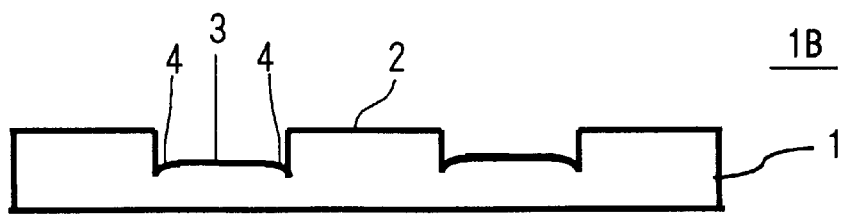

FIG. 1 is a schematic sectional view of a supporter of a first embodiment used for an information recording medium in the present invention;

FIG. 2 is a schematic sectional view of an information recording medium of a first embodiment in the present invention;

FIG. 3 is a schematic sectional view of a supporter of a second embodiment used for an information recording medium in the present invention;

FIG. 4 is a schematic sectional view of an information recording medium of a second embodiment in the present invention;

FIGS. 15 (a) to 15 (e) are schematic sectional views for explaining a manufacturing process of the supporter of the first embodiment shown in FIG. 1 in the present invention;

FIGS. 16 (a) to 16 (e) are schematic sectional views for explaining a manufacturing process of the supporter of the second embodiment shown in FIG. 3 in the present invention;

FIGS. 19 (a) to 19 (i) are schematic sectional views for explaining a manufacturing process of the supporter of a third embodiment in the present invention;

FIG. 17 is a schematic view for explaining a structure of a dry etching apparatus used in the manufacturing process of the supporter;

FIG. 18 is a schematic view for explaining a structure of another dry etching apparatus used in the manufacturing process of the supporter;

Through the drawings, like parts are designated with like reference characters, and a detailed description thereof is omitted for simplicity.

The present inventions have been obtained by studying the problems mentioned in the foregoing.

Figure 7:
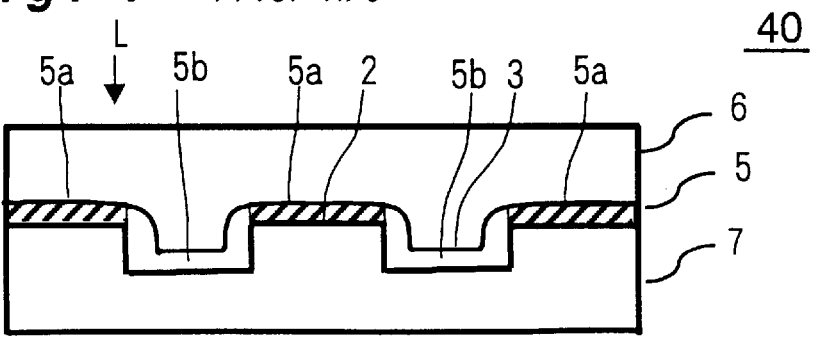
FIG. 7 is a schematic sectional view showing a state where the lands of the DWDD type information recording medium shown in FIG. 6 are annealed.

Specifically, in the DWDD type information recording medium 40 in the prior art shown in FIG. 7, the reason why the lands 2 have to be non-magnetized depends on a fact that the recording layer 5 is faithfully formed as one layer on the supporter 7 in accordance with a surface shape of the supporter by continuously forming the lands 2 and the grooves 3 without a gap, otherwise, in order to save the laser annealing process, the recording layer needs to be cut at every recording track. However, it is impossible to form designed discrete tracks by using a sputtering method utilized in forming the magneto-optical layer such as the recording layer 5 because of its good diffusion or invading characteristic of sputtered materials.

According to the present invention, it is possible to provide a supporter capable of forming a recording layer 5 having discrete tracks (capable of forming a gap between a groove 3 and a land 2 adjacent to each other) by employing a conventional thin-layer forming apparatus. Further, it is possible to provide an information recording medium having the discrete tracks by utilizing the support mentioned above.

Figure 5:
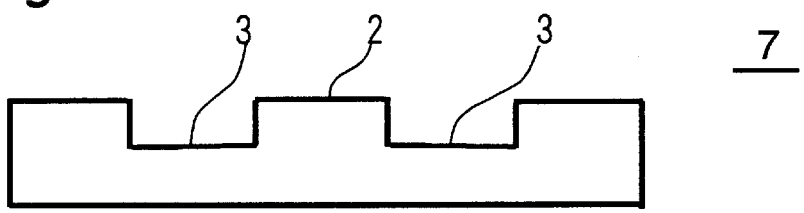
FIG. 5 is a schematic sectional view of a supporter used in an information recording medium in the prior art.

A supporter 1A of a first embodiment in the present invention is shown in FIG. 1. As seen from FIG. 1, on a surface of the supporter 1A, grooves 3 and lands 2 are alternately formed in the same manner as those of the supporter 40 in the prior art shown in FIG. 5.

However, it should be noted that in the supporter 1A of the first embodiment, there is provided one crevice 4 between a groove 3 and a land 2 adjacent to each other. A bottom surface of the groove 3 and a top surface of the land 2 are disposed to be parallel to each other, and there is provided one crevice 4 in each groove 3 disposed between the adjacent lands 2.

Here, the crevice 4 refers to a concave shape formed or bored in the groove 3 of the supporter 1A at a position lower than that of the bottom surface of the groove 3. A depth Dc of the crevice 4 is larger than a depth Dg of the groove 3 (Dc>Dg). The crevice 4 has a section of an inverse rectangular, i.e., a sharp V-letter ditch. When the sharp V-letter ditch is observed from an outside thereof, it seems to be a crevice Thus, it is named a crevice after its shape by the present inventor. In FIG. 1, a reference character W1 designates a width of the land 2, Wc a width of the crevice 4 and Wg+Wc a width of the groove 3.

In this embodiment, the crevice 4 is formed nearby one end 3a of the groove 3 in a width direction of the groove 3. However, the crevice 4 may be formed nearby the other end 3b though it not depicted. Further, the crevice 4 may be formed nearby a center portion in the groove 3 as a single one or plural ones, each having a sharp V-letter ditch, if necessary.

In other words, the supporter 1A of the present invention used for an information recording medium is applied to an information recording medium B (shown in FIG. 2) of the present invention, and has constructive features that it is formed with the lands 2 and grooves 3 alternately formed on the surface thereof as a minute track pattern. In addition, the respective grooves are formed with a crevice 4 having a depth Dc larger than that of the groove 3 nearby one end 3a or the other end 3b of the respective grooves 3 in the width direction of the groove 3.

In summary, a supporter for an information recording medium according to the present invention is used for an information recording medium according to the present invention, and has constructive features that it has the lands 2 and the grooves 3 alternately formed thereon as a minute track pattern, and, at least, one crevice 4 having a depth Dc larger than a depth Dg of the respective grooves 3 is formed in the respective grooves 3.

As shown in FIG. 2, the information recording medium B of the present invention comprises the supporter 1A shown in FIG. 1, a recording layer 5 formed on the supporter 1A and a protection layer 6 on the recording layer 5, which are laminated in this order.

Here, the recording layer 5 is formed on a surface of the supporter 1A by a sputtering method, however, sputtered materials from a sputtering apparatus are not attached in the crevice 4 because the crevice 4 itself becomes a shadow for the sputtering, resulting in that the recording layer 5 is scarcely formed in the crevice 4, even when the sputtering apparatus has a good diffusion or invading characteristic of the sputtered materials.

Accordingly, the recording layer 5 has such a shape as being cut nearby the respective crevices 4. Only one crevice 4 is formed in the respective grooves 3. Thus, a number of effective recording tracks coincides with the number of the lands 2 ( referred to as a land recording).

On the other hand, the protection layer 6 is formed as a thick layer on the recording layer 5 by a spin coating method, resulting in a continuous flat layer thereon. However, it should be noted that an important thing is that the recording layer 5 is discontinuously formed. The continuous construction of the protection layer 6 does not interfere with the recording layer 5.

In other words, the information recording medium B of the present invention has constructive features as follows.

On the supporter 1A of the present invention, at least, a recording layer 5 is formed. In addition, the lands 2 and grooves 3 are alternately formed on the supporter 1A as a minute recording track pattern. Further, at least, one crevice 4 having a depth Dc larger than a depth Dg of the respective grooves 3 is formed within the respective grooves 3 nearby one end 3a (or 3b) of the respective grooves 3 in the width direction thereof.

In summary, the information recording medium of the present invention has constructive features that on the supporter of the present invention, at least, a recording layer 5 is formed, and the lands 2 and grooves 3 are alternately formed on the supporter as a minute recording track pattern, and, at least, one crevice 4 having a depth Dc larger than a depth Dg of the respective grooves 3 is formed within the respective grooves 3.

As shown in FIG. 3, a supporter 1B of a second embodiment in the present invention has a alternately repeated construction of a land 2 and a groove 3 adjacent to the land 2 in the same manner as mentioned in the prior art, and is formed with a pair of crevices 4, 4 in the respective grooves 3 nearby both ends of the respective grooves 3 in a width direction thereof. Each of the pair of crevices 4, 4 is formed in the groove 3 at a position lower than that of a bottom surface of the groove 3 so that a depth Dc of the crevice 4 is larger than a depth Dg of the groove 3, and is formed to have an inverse rectangular in section, i.e., a sharp V-letter shape in section as mentioned in the foregoing.

In FIG. 3, a reference character Wl represents a width of the land 2, Wc a width of the crevice 4 and Wg+2Wc a width of the groove 3.

In other words, the supporter 1B of the second embodiment in the present invention used for an information recording medium is applied to an information recording medium C (shown in FIG. 4) of a second embodiment in the present invention, and has constructive features that it is alternately formed with the lands 2 and grooves 3 thereon as a minute track pattern. Further, in the respective grooves 3 there are formed a pair of crevices 4, 4 each having a depth Dc larger than a depth Dg of the groove 3 nearby both ends 3a, 3b of the respective grooves 3 in the width direction of the groove 3.

As shown in FIG. 4, the information recording medium C of the second embodiment in the present invention has the supporter 1B shown in FIG. 3, a recording layer 5 formed on the supporter 1B and a protection layer 6 on the recording layer 5, which are laminated in this order. Here, the recording layer 5 is formed by a sputtering method, however, sputtered materials from a sputtering apparatus are not attached in the crevice 4 because the crevice 4 itself becomes a shadow for the sputtering, resulting in that recording layer 5 is scarcely formed in the crevice 4 even when the sputtering apparatus has a good diffusion or invading characteristic of the sputtered materials. Accordingly, the recording layer 5 has such a shape as being cut nearby the respective crevices 4. Two crevices 4 are formed in the respective grooves 3. Thus, a number of effective recording tracks coincides with a sum of a number of the lands 2 and a number of the grooves 3 (referred to as a land/groove recording).

On the other hand, the protection layer 6 is formed as a thick layer on the recording layer 5 by a spin coating method, resulting in a continuous flat layer thereon. However, it should be noted that an important thing is that the recording layer 5 is discontinuously formed. The continuous construction of the protection layer 6 does not interfere with the recording layer 5.

As mentioned above, according to the information recording medium C of the second embodiment in the present invention it is possible to realize a land/groove recording which was impossible in the prior art, resulting in a double recording capacity compared to that of the recording medium B of the first embodiment shown in FIG. 2.

In other words, the information recording medium C of the present invention has constructive features as follows.

On the supporter 1B mentioned in the foregoing there is formed, at least, a recording layer 5. In addition, the lands 2 and grooves 3 are alternately formed on a surface of the supporter as a minute recording track pattern. Further, a pair of crevices 4 each having a depth Dc larger than a depth Dg of the respective grooves 3 is formed within the respective grooves 3 nearby both ends 3a, 3b of the respective grooves 3 in the width direction thereof.

Further, as mentioned in the foregoing, in the information recording medium B of the first embodiment shown in FIG. 2, the recording layer 5 formed on the supporter 1A was cut into a plurality of recording areas 5c every minute recording track.

On the other hand, in the information recording medium C of the second embodiment shown in FIG. 4, the recording layer 5 formed on the supporter 1B is cut into a plurality of recording areas 5d every minute recording track.

Furthermore, the recording layer 5, as a constructive member of the recording medium A or B, has, at least, a super-resolution recording layer, and this super-resolution recording layer is made of the DWDD type super-resolution magneto-optical recording layer of a triple-layered film composed of the displacement layer, the switching layer and the memory layer as mentioned in the foregoing.

Next, the description is given of the recording mediums of concert embodiments 1 to 4 in the present invention.

[Embodiment 1]

An example of a card type information recording medium formed with the lands and the grooves in parallel.

A supporter 1A made of a quartz glass plate of 85 mm ×54 mm×0.7 mm was prepared. The schematic sectional view of the supporter 1A is shown in FIG. 1, wherein the lands 2, the grooves 3 and the crevices 4 are formed as mentioned in the foregoing.

FIG. 8 is a chart showing dimensions of constructive parts of the support shown in FIG. 1.

The dimensions of constructive parts of the supporter 1A are shown in FIG. 8 in accordance with the reference characters shown in FIG. 1.

Specifically, a width W1 of the land 2 is 0.55 μm, a width (Wg +Wc) of the groove is 0.55 μm, wherein the width Wg is 0.51 μm and the width Wc of the crevice 4 is 0.04 μm, a depth Dg of the groove 3 is 0.2 μm and a depth Dc of the crevice 4 is 0.35 μm.

Next, on the supporter 1A, a recording layer 5 and a protection layer 6 were formed. The recording layer 5 was formed by a well known sputtering method.

FIG. 9 is a section of a recording layer for explaining a concrete lamination structure of the recording layer in the present invention.

Materials used for the recording layer 5 are shown in FIG. 9. Specifically, the recording layer 5 was formed by sandwiching a magneto-optical layer of the triple-layered film (a displacement layer 5a1 of GdCo having a thickness of 30 nm, a switching layer 5a2 of DyFe having a thickness of 10 nm and a memory layer 5a3 of TbFeCo having a thickness of 40 nm) known as the DWDD (Domain Wall Displacement Detection) type super-resolution layer between a first dielectric layer 5a4 of SiO having thickness of 100 nm and a second dielectric layer 5a5 of TaO having a thickness of 60 nm. Next, the protection layer 6 was formed on the recording layer 5 by coating a thermosetting resin at a thickness of 15 μm by a well known screen printing method. The protection layer was cured at a temperature of 80° C. by baking. This card was cut in a perpendicular direction to recording tracks. The section of the card was observed with a scanning electron microscope. As a result, it was confirmed that the section had the sectional shape as shown as shown in FIG. 2.

Figure 12:
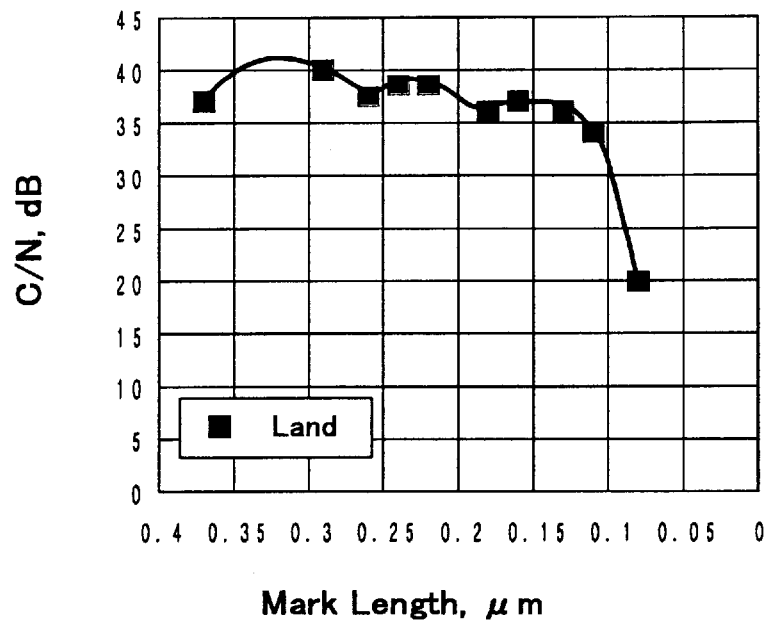
FIG. 12 is a graph showing a mark length vs C/N reproducing characteristic of the information recording medium of the first embodiment shown in FIG. 2.

FIG. 12 is a graph showing a mark length vs C/N reproducing characteristic of the information recording medium of the first embodiment shown in FIG. 2.

Next, an information signal was recorded/reproduced on/from this card by irradiating and focusing a laser beam on the lands 2 thereof, resulting in that a reproducing characteristic of a mark length vs C/N was obtained as shown in FIG. 12. In a recording apparatus used here, there were employed a laser beam having a wavelength of 780 nm and an objective lens having a numerical aperture of 0.55. In this case, a single frequency recording/reproducing was performed, however, it should be noted that no laser annealing was carried out. The recording power was 3.5 mW and the reproducing power was 1.9 mW. Upon reproducing it was confirmed that a super-resolution phenomenon was developed because a recording/reproducing of the shortest mark length of 0.08 μm was attained. Further, the C/N at a mark length of 0.1 μm was 34 dB which is a reproducing level enough for a practical use. In this connection, a reproducing limitation obtained from a theoretical calculation by using the wavelength and the numerical aperture is a mark length of 0.3 5 μm.

[Embodiment 2]

An example of an information recording disc, wherein a land and a groove are coaxially and spirally formed in parallel to each other.

A supporter 1B made of a soda lime glass plate having a diameter of 120 mm and a thickness of 0.6 mm was prepared. The schematic sectional view of the supporter 1B is shown in FIG. 3, wherein the land 2, the groove 3 having the crevices 4 are coaxially and spirally formed in parallel to each other.

FIG. 10 is a chart showing dimensions of constructive parts of the supporter of the second embodiment shown in FIG. 3.

The dimensional construction of the supporter 1B is shown in FIG. 10 in accordance with the reference characters shown in FIG. 3.

Specifically, a width W1 of the land 2 is 0.51 μm, a width (Wg+2Wc) of the groove 3 is 0.59 μm, wherein the width Wg is 0.51 μm and the width Wc of the crevice 4 is 0.04 μm, the depth Dg of the groove 3 is 0.2 μm and the depth Dc of the crevice 4 is 0.35 μm.

Next, on this supporter 1B, the recording layer 5 and the protection layer 6 were formed.

FIG. 11 is a section of another recording layer for explaining a concrete laminated structure of the recording layer in the present invention.

The recording layer 5 was made of recording materials shown in FIG. 11 by using a known sputtering method.

Specifically, the recording layer 5 was formed by sandwiching the DWDD type super-resolution layer such as the triple-layered magneto-optical film composed of the displacement layer 5b1 of GdFeCr (thickness of 30 nm), the switching layer 5b2 of TbFeCr (thickness of 10 nm) and the memory layer 5b3 of TbFeCoCr (thickness of 80 nm) between a first dielectric layer 5b4 of SiN (thickness of 90 nm) and a second dielectric layer 5b5 of SiN (thickness of 50 nm).

Next, the protection layer 6 was formed on the second dielectric layer 5b5 in such a manner that an ultraviolet curing resin was coated to be 6 μm by the well known thin film rotating forming method and was cured by irradiating ultraviolet rays thereon.

This information recording disc was cut in a perpendicular direction to the recording tracks, and the section of the disc was observed with a scanning electron microscope. Thus, it was confirmed that the section of the disc had a sectional shape as shown in FIG. 4.

Figure 13:
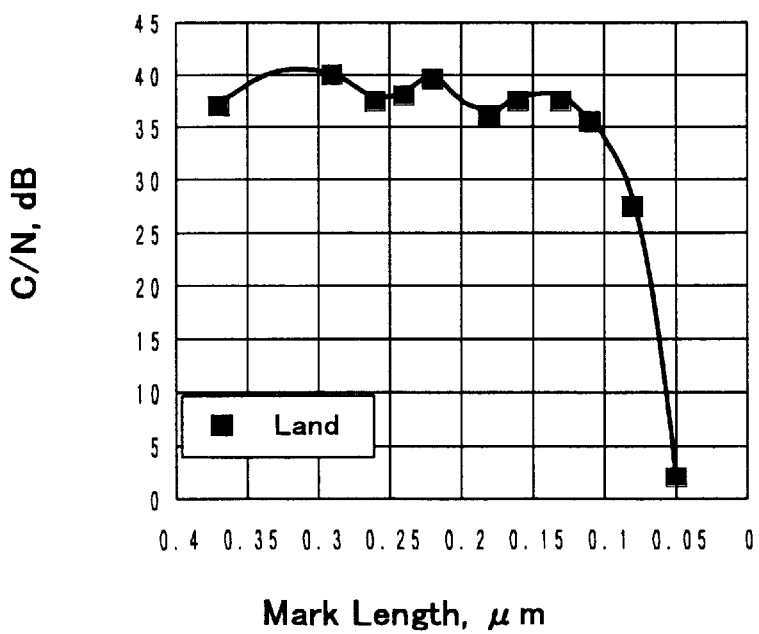
FIG. 13 is a graph showing a mark length vs C/N reproducing characteristics as the land recording of the information recording medium of the second embodiment.

FIG. 13 is a graph showing a mark length vs C/N reproducing characteristics as the land recording of the information recording medium of the second embodiment.

Next, an information signal was recorded/reproduced on/from this information recording disc by irradiating and focusing a laser beam on the lands 2 thereof, resulting in a reproducing characteristic of a mark length vs C/N as shown in FIG. 13. In the recording apparatus used here, there were employed a laser beam having a wavelength of 690 nm and an objective lens having a numerical aperture of 0.6, and a single frequency recording/reproducing was carried out. The recording power was 3.7 mW and the reproducing power was 2.2 mW. Upon reproducing it was confirmed that a recording of a mark length of 0.06 μm had been attained, resulting in a generation of a super-resolution phenomenon. Further, the C/N at a mark length of 0.1 μm was 36 dB which is a reproducing level enough for a practical use. In this connection, a reproducing limitation obtained from a theoretical calculation by using the wavelength and the numerical aperture is a mark length of 0.26 μm.

Figure 14:
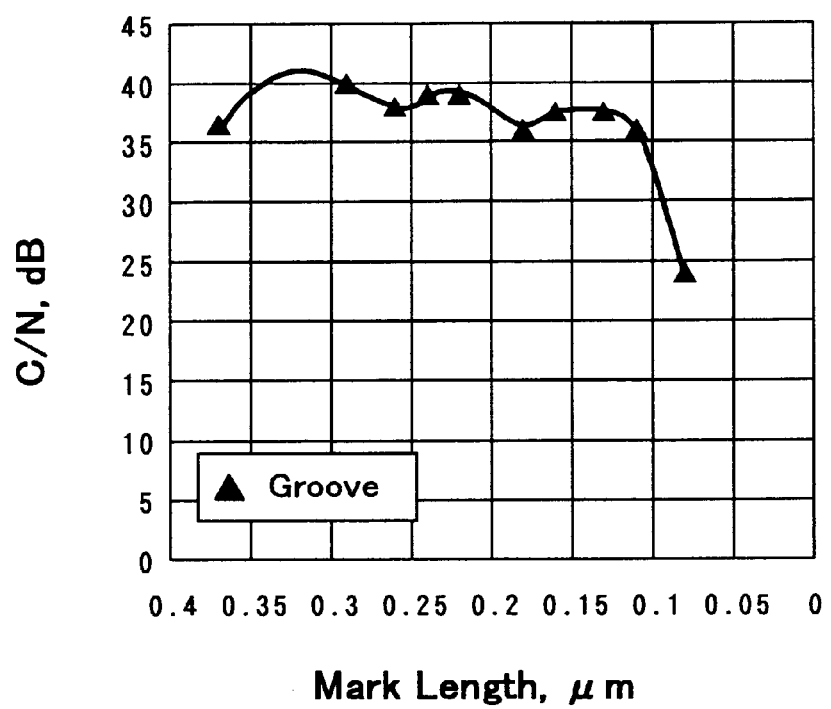
FIG. 14 is a graph showing a mark length vs C/N reproducing characteristics as the groove recording of the information recording medium of the second embodiment.

FIG. 14 is a graph showing a mark length vs C/N reproducing characteristics as the groove recording of the information recording medium of the second embodiment Next, an information recording signal was recorded/reproduced on/from the grooves 3 by irradiating and focusing the laser beam on the grooves 3, resulting in a reproducing characteristic of a mark vs C/N as shown in FIG. 14. As seen from FIG. 14, it was confirmed that the shortest mark of 0.08 μm had been attained, resulting in a generation of the super-resolution phenomenon. Further, the C/N at a mark length of 0.1 μm is 35 dB which is a reproducing level enough for a practical use.

Thus, it should be noted that the land/groove recording has been realized in the information recording medium 1B of the second embodiment as mentioned referring to FIGS. 13 and 14.

As seen from the embodiments in the foregoing, the recording layer 5 can be automatically cut into every track by employing the supporter 1A or 1B having crevices 4 even when the conventional sputtering apparatus is utilized. Here, an important thing is that it is possible to separate the recording layer 5 into every track at a time when the sputtering thin layer forming process has been completed without an etching process. In other words, a self-cutting of the recording layer 5 is realized at every track. Thereby, it is possible to realize a high density recording/reproducing. Especially, it is possible to save the laser annealing for the super-resolution recording layer represented by the DWDD, resulting in a realization of the land/groove recording.

The above description has been given of the supporters used for the information recording mediums and the information recording mediums having the above supporters, however, the present invention is not limited to these embodiments. The materials and dimensions of the constructive members may be optionally changed if necessary.

In the present invention, the supporter to be used needs to be formed or bored with a minute track pattern having crevices 4, and can be made from various kinds of synthetic resins such as polycarbonate, poly (methyl methacrylate), polystyren, polycarbonate-polystyren copolymer, poly (vinyl chloride), alicylic polyolefin and poly (methyl pentene), and glasses such as a soda aluminosilicate glass and a borosilicate glass. Further, on the supporter 1A or 1B, pits, holograms or certified marks may be formed other than the lands 2 grooves 3 and crevices 4, if necessary.

As the materials of the recording layer 5, there may be used inorganic materials such as neodymium, dysprosium, bismuth, palladium, samarium, holmium, erbium, ytterbium, ruthenium, praseodymium manganese, titanium, aluminum, silicon, indium, antimony, tellurium, selenium, arsenic, platinum, gold, silver, copper, tin, sulfur, and its alloys (including oxide, nitride and carbide) other than terbium, cobalt, iron, gadolinium and chromium.

Further, as the materials of the dielectric layers subsidiarily used, zinc, magnesium, calcium, aluminum, chromium, zirconium, fluorine, sulfur, and its alloys may be used other than silicon and tantalum.

Furthermore, as the materials of the reflective layer subsidiarily used, aluminum, gold, silver, copper, iron, zinc, chromium, tantalum, titanium, molybdenum, silicon and nickel, and its alloys may be laminated.

Further, as the materials of the protection layer 6, there may be employed various kinds of radiation (including visible lights) curing resins, an electron beam curing resin, a moist curing resin and a mixing type curing resin other than the thermosetting resin or the ultraviolet ray curing resin. On the protection layer 6, characters or the like may be printed, if necessary.

The wavelength of the laser beam used for recording or reproducing is not limited to 780 nm or 690 nm. It is possible to employ a wave length of 830, 650, 635, 532, 430, 410 or 370 nm. Further, as to the numerical aperture of the objective lens used for the apparatus, it is possible to employ 0.4, 0.45, 0.65, 0.7, 0.75, 0.8, 0.85, or 0.9.other than 0.55 and 0.6. Further, it is possible to employ a numerical aperture larger than 1 as typically seen in a solid immersion lens. Needless to say, it is possible to change the thickness and the structure of the respective layers 5, 6 and the external dimensions of the supporter 1A or 1B, and its minute dimensions The description has been given of the examples of the card and the disc as the information recording medium and the supporters for the mediums in the present invention. However, the present invention is not limited to these embodiments but applicable to others, for instance, to an optical floppy disc and an optical tape other than the card and the disc.

As the recording layer 5 used in the Embodiments 1 and 2, the DWDD type super-resolution layer is employed, however, the recording layer of the present invention is not limited to it. Other super-resolution layers based on other reproducing principles may be employed for it.

Next, a description is given of manufacturing methods of the supporters 1A and 1B of a first and second embodiment in the present invention.

The dimensions of the respective crevices 4 formed on the supporter are smaller than those of the lands 2 and grooves 3 formed as a minute track pattern. Further, the respective crevices 4 need to be formed at a precise position in the respective grooves 4. If a conventional photo-etching method is employed to form the minute track pattern and the crevices 4, there are needed two processes, a groove forming process and a crevice forming process, resulting in a problem of a difficulty of the positional adjustment.

In the manufacture method of the supporter in the present invention, the above problem has been eliminated by forming the crevices 4 and the grooves 3 at the same time on the supporter by a dry etching method.

The manufacture method of the supporters 1A and 1B of the first and second embodiments in the present invention generally has a series of processes (a) to (e) as follows:

(a) preparing a supporter 1 polished in high precision and cleaned;

(b) forming a patterning mask 8 on the supporter 1 by coating a mask material having a dry etching proof;

(c) forming a pattern approximately corresponding to a necessary minute track pattern by a conventional photolithography method, wherein a flat portion 9 approximately corresponds to a position of a land 2, and an opening portion 10 approximately corresponds to a position of both a groove 3 and a crevice 4 after all the processes are completed;

(d) forming the groove 3 and crevice 4 at the same time in the opening portion 10 of the pattern formed on the supporter 1 by a dry etching method with a special dry etching apparatus AA or BB according to the present invention, and (e) removing the patterning mask 8 remaining on the supporter 1, resulting in the supporter 1A or 1B shown in FIG. 1 or 3.

In the above processes, the important things reside in special etching methods or apparatuses for simultaneously forming the groove 3 and crevice 4.

These methods and apparatuses are explained in detail through an example of the supporter 1A explained in the Embodiment 1 and the supporter 1B explained in the Embodiment 2 mentioned in the foregoing.

FIGS. 15 (a) to 15 (e) are schematic views for explaining a manufacturing method of the supporter of the first embodiment shown in FIG. 1 in the present invention, FIG. 17 is a schematic view for explaining a dry etching apparatus of the present invention.

First, a description is given of a manufacturing method of a first embodiment through an example of the supporter 1A (FIGS. 1 and 8) on processes (1) to (5) mentioned below, referring to FIGS. 15 (a) to 15 (e).

(1) preparing a supporter 1 having a mirror surface made of a quartz glass plate (85 mm×54 mm×0.7 mm) of which surface is polished in high precision and cleaned (FIG. 15 (a));

(2) forming a patterning mask 8 on the supporter 1 by uniformly coating chromium as the patterning mask 8 (FIG. 15(b));

(3) forming a pattern on the patterning mask 8 corresponding to a necessary minute track pattern by the conventional photolithography (FIG. 15 (c)). Specifically, a photo-resist was coated as a thin layer on the patterning mask 8. After a negative-film having a parallel pattern of line and space was superimposed on the thin layer of the photo-resist, an exposure and development were performed (not shown). Successively, the patterning mask 8 on the supporter was selectively removed by a wet etching method i.e., by dipping the supporter 1 into a mixed solution of 2-cerium ammon and glacial acetic acid, resulting in a pattern of the patterning mask 8 having flat portions 9 having a width of 0.55 μm and opening portions 10 having a width of 0.55 μm after the photo-resist remained was removed.

(4) The supporter 1 was placed on a substrate electrode 22 of a parallel plate type dry etching apparatus AA shown in FIG. 17 of the present invention. Then, the opening portions 10 of the patterning mask 8 were dry-etched by using CF4 gas (FIG. 15 (d)).

(5) After etched, the patterning mask 8 was removed by dipping the supporter 1 into a mixed solution of 2-cerium ammon and glacial acetic acid, resulting in the supporter 1A (FIG. 15 (e)).

In the above process (4), the dry etching process was performed by using a dry etching apparatus AA shown in FIG. 17. The dry etching apparatus AA is provided with means for simultaneously forming or boring the grooves 3 and the crevices 4 in the supporter 1 at positions corresponding to the opening portions 10 of the patterning mask 8 by dry-etching, as mentioned hereinafter.

The dry etching apparatus AA has a construction of a parallel plate type etching apparatus. Specifically, referring to FIG. 17, a reference character 1 represents the supporter having a mirror surface to be dry-etched as a sample, and the supporter 1 to be dry-etched is placed on a substrate electrode 22. A reference character 23 represents a first valve installed in a vacuum exhaust system channel 23a, 24 a second valve installed in an etching gas exhaust system channel 24a, 25 a conductance valve installed in a channel formed between a chamber 26 and the first and second valves 23, 24.

A reference character 27 represents a flowmeter, and 28 a high frequency power source. A reference character 29 represents an etching gas inlet of which one end is connected to the flowmeter 27 and of which another other end is protruding into the chamber 26, 20 an opposed electrode as a grounded pole which is fixed in a position apart from the substrate electrode 22 at a predetermined distance, and 21 a gas bomb for dry-etching. Further, the etching gas inlet 29 is disposed approximately at an opposite side of the conductance valve 25, resulting that the supporter 1 to be dry-etched stands between the etching gas inlet 29 and the conductance valve 25. Thus, the etching gas flows over the support 1 from the gas inlet 29 to the etching gas exhaust system 24a through the conductance valve 25. Incidentally, the substrate electrode 22 is cooled down at temperature of 22°0 C.

A dry-etching process of the supporter 1 to be try-etched is successively performed with the dry etching apparatus AA according to the following processes (1) to (3). After the supporter 1 as a sample is placed on the substrate electrode 22, the chamber 26 is evacuated in a high vacuum level by opening the first valve 23 installed in the high vacuum exhaust system 23a and closing the second valve 24 installed in the etching gas exhaust system 24a and operating the conductance valve (CV) 25. Next, the high vacuum exhaust system 23a is changed into the etching gas exhaust system 24a by a closing the first valve 23 and opening the second valve 24. In this state, the etching gas is introduced into the chamber 26 from the gas bomb 21 through the flowmeter 27 and the etching gas inlet 29. After the flowmeter 27 and the conductance valve 25 are adjusted so that the chamber 26 satisfies predetermined conditions, the supporter 1 as the sample is dry-etched with a plasma developed by applying a high frequency voltage from the high frequency power source 28 between the substrate electrode 22 and the opposed electrode 20. Thus, it is possible to dry-etch the supporter 1 corresponding to the opening portions 10 of the patterning mask 8 by using the dry etching apparatus AA.

Here, a description is given of the reason why the groove 3 and the crevice 4 are formed at the same time by the dry etching method with the dry etching apparatus AA.

The crevice 4 shown in FIG. 1 is not formed at both sides of the groove 3 therein but only at one side thereof. This reason is not sufficiently made clear, however, it seems that the development of the crevice 4 is related to a flow of the etching gas.

Specifically, a boundary where the crevice 4 resides corresponds to an up-stream side of the etching gas (a side of the gas inlet 29) and a boundary where the crevice 4 does not reside corresponds to a down-stream side of the etching gas (a side of the conductance valve 25). The reason for the development of the crevice 4 is not definitely clear as mentioned above, however, when the etching gas is unequally provided in the chamber 26 like as this apparatus, the respective crevices 4 are unevenly distributed at only a predetermined one side of the respective grooves 3. It is considered that in the plasma gas, both decomposition (etching) and accumulation (recombination of etched materials with the sample to be etched) are simultaneously developed, and its balance is broken when the etching gas is unevenly provided into the chamber 26, resulting in the uneven distribution of the crevices 4.

Under various kinds of etching conditions, the etching experiments were tried by the inventor, and a good experimental result was obtained of the supporter 1A shown in FIGS. 1, 8 under following dry-etching conditions.

etching gas: CHF3
gas pressure: 60 mtorr
gas flow rate: 57 sccm
etching time: 3 minutes 30 seconds FIGS. 16 (a) to 16 (e) are schematic views for explaining a manufacturing method of the supporter of the second embodiment shown in FIGS. 3; and FIG. 18 is a schematic view for explaining another etching apparatus used in the manufacturing method shown in FIGS. 16 (a) to 16 (e) in the present invention.

Next, the description is given of a manufacture method of a second embodiment through an example of the supporter 1B shown in FIGS. 3, 10, referring to FIGS. 16 (a) to 16 (e), wherein like components are shown with like reference characters and the detailed descriptions thereof are omitted for simplicity. Specifically, (1) There was prepared a mirror supporter 1 made of a soda lime glass plate (a diameter of 120 mm and a thickness of 0.6 mm) of which surface is polished in high precision and cleaned (FIG. 16 (a)).

(2) A patterning mask 8 was formed on the mirror supporter 1 by uniformly coating photo-resist thereon (FIG. 16(b)).

(3) A pattern corresponding to a necessary minute track pattern was formed by a conventional laser beam recording method (FIG. 16 (c)). Specifically, a spiral groove pattern was recorded on the photo-resist as the patterning mask 8 by irradiating and focusing a laser beam thereon with an objective lens, and the photo-resist was developed(not shown) Thereby, there was obtained a pattern having flat portions 9 having a width of 0.5 $\mu$m and opening portions 10 having a width of 0.6 $\mu$m.

(4) The supporter 1 mentioned above was set in the parallel plate type dry etching apparatus BB shown in FIG. 18, and the dry etching was performed on the supporter 1 at positions corresponding to the opening portions 10 of the patterning mask (FIG. 16 (d)).

(5) After dry etching, the patterning mask 8 was removed by ashing with oxygen plasma, resulting in the supporter 1B (FIG. 16 (e)).

In the above manufacture processes of the supporter 1B, the dry etching process (5) is performed by using the dry etching apparatus BB shown in FIG. 18. The dry etching apparatus BB has means for simultaneously forming or boring the grooves 3 and the crevices 4 in the surface of the supporter 1 at positions corresponding to the opening portions 10 of the patterning mask 8 by dry-etching.

The dry etching apparatus BB has a similar construction to the dry etching apparatus AA mentioned in the foregoing, however, an etching gas providing structure this apparatus BB is different from that of the dry etching apparatus AA. Specifically, in the dry etching apparatus BB, there are circularly disposed a plurality of etching gas inlets 29 around the mirror supporter 1 to be etched, so that the plurality of etching gas inlets 29 are allowed to provide the etching gas to the mirror supporter 1 from every direction. Other constructions of the apparatus BB are the same as those of the dry etching apparatus AA. The dry etching processes by using the dry etching apparatus BB are approximately the same as the processes (1) to (5) by using the dry etching apparatus AA, as mentioned in the foregoing, thus, the detailed explanation thereof is omitted here.

Next, the description is given of the reason why the grooves 3 and the crevices 4 are simultaneously formed by using the dry etching apparatus BB.

As mentioned in the foregoing, in the dry etching apparatus BB, the etching gas is provided to the supporter 1 from every direction. In this case, ions have an inclination to concentrate to a pointed portion, for instance, a boundary portion between the flat portion 9 and the opening portion 10. This inclination is remarkably enhanced at a high etching gas pressure.

Accordingly, in the present invention, in order to form the crevice 4 at both sides of the opening portion 10, a high etching gas pressure, which is not employed in a conventional dry etching method, is employed. The high etching gas pressure refers to a gas pressure of not lower than 35 mtorr. It has been confirmed by the present inventor through his experimental efforts that the dry etching was remarkably enhanced at the both side of the respective opening portions 10 because of the ion concentration thereto only when the etching gas pressure was made to be not lower than 35 mtorr, resulting in the crevices 4 formed at both sides in the respective grooves 3. Incidentally, when the etching gas pressure is made to be higher than 500 mtorr, a dry etching speed is extremely decreased because of a degradation of the kinetic energy of the plasma gas itself.

Accordingly, it is preferable to employ an etching gas pressure range of 35 to 500 mtorr. Especially, in this range, it is possible to form the crevice 4 and the groove 3 having the dimensions shown in FIG. 10.

According to the experimental results, the supporter 1B shown in FIG. 3 has been obtained under the conditions 1 to 3 described below.

Condition 1
etching gas: CF4
gas pressure: 35 mtorr
flow rate: 40 sccm
etching time 6 minutes and 5 second
Condition 2
etching gas: CF4
gas pressure: 50 mtorr
flow rate: 53 sccm
etching time 6 minutes and 25 second
Condition 3
etching gas: CF4
gas pressure: 65 mtorr
flow rate : 64 sccm
etching time 5 minutes and 55 second According to this embodiment, the etching gas pressure used in the dry etching process in the present invention is 35 to 500 mtorr.

Under this condition, the grooves 3 and the crevices 4 are simultaneously formed or bored on the surface of the mirror supporter 1.

In the above embodiments, the manufacture methods of the supporters 1A, 1B are explained in detail. Further, in the above embodiments, as the material of the mirror supporter 1, the quartz glass and a soda lime glass are used, however, it is possible to employ soda alumina silicate glass or a barium borosilicate glass other than those glasses. Further, as the etching gas, CHF3 and CF4 are employed in the embodiments, however, it is not limited to those gases. It is possible to employ C2F6, C3F8, NF3, SF6 C2F4, C3F6, C4F8, C4F10, C5F8, C6F14, CF3CFOCF2, C6F5CF2CFCF2, CF3Br, CF31, C2F51, CF2Cl2, CFCl3 CH2F2, CHF2CF3, CH2FCF3, CH3CHF2, C2H3F3, C3HF7, CF3, CH2CF3, C6F5CHCH2, Cl2, CCl4, SiCl4, BCl3, PCl3, CCl2F2, CCl3F, BBr3, CH2Cl2, CHCl3 and mixed gases thereof, and other mixed gases containing oxygen, hydrogen, argon, He, N2, Ne, Ar, Kr, Xe, O3, CO, CO2, H2O (vapor), CH4, CH3CH3, CH3CH2CH3, CH3CH2CH2CH3, CH2CH2, CH2CHCH3, CH2CH2CH2CH2, HCCH, and CH3CCH.

Further, in the above embodiments, the description is given of examples where glasses are used as the material of the supporter 1 and the supporter 1 is dry-etched. Needless to say, the material of the supporter 1 is not limited to glasses. Other materials such as a metal and a plastic resin may be employed, because a feature of the present invention resides in the surface shape formed or bored on the surface of the supporter 1.

Accordingly, even when the supporter 1 is made of a plastic resin being shaped by using a stamper, it is applicable to the recording medium of the present invention as long as the supporter 1 has the same surface shape (lands, grooves and crevices) as mentioned in the foregoing.

The manufacturing method of such a stamper for producing a plurality of replicas of the supporter 1 is described in detail hereinafter. The manufacturing processes shown in FIGS. 15 (a) to (e) and 16 (a) to (e) are applied to a manufacture of a glass master having the same size as that of the supporter 1 or larger than that, and it is possible to produce the stamper as a replica of the glass master by using a conventional optical disc manufacturing process as it is.

Further, as mentioned in the foregoing, the manufacturing apparatus used for producing the supporter according to the manufacturing methods in the present invention may have means for forming a patterning mask on the supporter 1 which is polished in high precision and cleaned, means for forming a pattern on the supporter corresponding to a minute track pattern, means for simultaneously forming or boring the grooves and crevices in the supporter by a dry-etching method under a gas pressure of 35 to 500 mtorr and means for removing the patterning mask.

[Embodiment 3]

Next, a description is given of an information recording medium of a third embodiment in the present invention employing a plastic supporter as the supporter 1 and an improved DWDD layer as the recording layer.

FIGS. 19 (a) to 19 (i) are schematic view for explaining a third manufacturing method of the supporter in the present invention.

First, the description is given of a manufacturing method of a supporter of a third embodiment through an example of a plastic supporter having crevices, referring to FIGS. 19 (a) to 19 (i).

(1) preparing a base plate 11 (a diameter of 200 mm and a thickness of 10 mm) made of a soda lime glass being polished in high precise and cleaned (FIG. 19 (a)).

(2) forming a patterning mask 8 on the base plate 11 by coating a photo-resist as a masking material (FIG. 19 (b)).

(3) forming a pattern on the patterning mask 8 corresponding to a necessary minute track pattern by a conventional laser beam recording method (FIG. 19 (c)). Specifically, a spiral groove pattern was formed on the patterning mask 8 made of the photo-resist by irradiating and focusing the laser beam thereon with an objective lens, and was developed (not shown). Thereby, a parallel spiral pattern having flat portions 9 having a width of about 0.5 μm and opening portions 10 having a width of about 0.6 μm was obtained.

(4) Setting the base plate 11 in the parallel plate type dry etching apparatus BB (FIG. 18), and dry etching the base plate 11 corresponding to the opening portions 10 of the patterning mask 8 (FIG. 19 (d)). The dry etching conditions were as follows.

etching gas: CF4
gas pressure: 50 mtorr
flow rate: 53 sccm
etching time: 6 minutes 25 seconds (5) removing the patterning mask 8 from the base plate 11 by an ashing treatment with oxygen plasma, resulting in a glass master 11B (FIG. 19 (e)).

(6) forming a conductive layer 12 on the glass master 11B by sputtering nickel at a thickness of 0.1 μm (FIG. 19 (f)).

(7) dipping the glass master 11B in a nickel electroplating tab and causing the conductive layer 12 to grow to a plated layer 13 having a thickness of 250 μm by applying a voltage to the conductive layer 12 as a cathode (FIG. 19 (g)).

(8) integrally forming a stamper 14B with the conductive layer 12 and the plated layer 13 by separating it from the glass master 11B (FIG. 19 (h)).

(9) setting the stamper 14B to an injection molding die after a bottom (having no pattern) of the stamper 14B was polished and a periphery thereof was cut Then, a supporter 1B having an upset pattern with respect to a concavity and a convexity was obtained by injection molding method using alicyclic polyolefin. The diameter of the supporter 1B is 130 mm, and the thickness thereof is 1.2 mm (FIG. 19 (i)).

Further, the surface shape thereof satisfies the dimensions shown in FIG. 10. Specifically, the width W1 of the land 2 is 0.51 μm and in the width (Wg+Wc) of the groove 3, Wg is 0.51 μm, the depth Dg of the groove 3 is 0.2 μm and the width Wc of the crevice 4 is 0.04 μm and the depth Dc of the crevice 4 is 0.35 μm.

Figure 20:
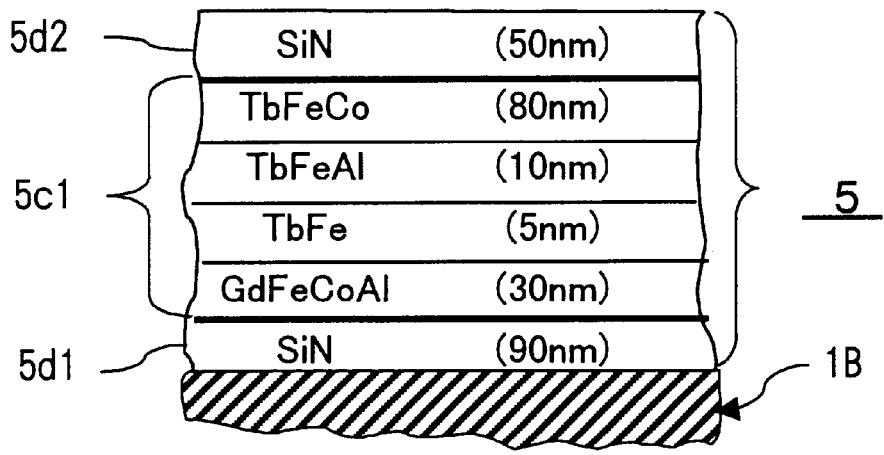
FIG. 20 is a section of other recording layer for explaining a concrete laminated structure of the recording layer in the present invention.

FIG. 20 is a section of other recording layer for explaining a concrete laminated structure of the recording layer in the present invention.

Next, on the supporter 1B, there were formed the recording layer 5 and the protection layer 6. The recording layer 5 was formed by the well known sputtering method using materials shown in FIG. 20. Specifically, the recording layer 5 has a laminated construction by sandwiching an improved DWDD super-resolution layer 5 cl made of four magneto-optical layers (GdFeCoAl, TbFe, TbFeAl, and TbFeCo) between first and second SiN dielectric layers 5d1, 5d2. Next, the protection layer 6 was formed on the recording layer 5 at a thickness of 8 μm with an ultraviolet ray curing resin by the well known spin coating method, and was cured by irradiating an ultraviolet ray A+B+C wave.

This information recording disc was vertically cut to the track surface, and the section of the disc was observed with the scanning type electroscope. As a result, the section was confirmed to have the sectional shape shown in FIG. 4.

Figure 21:
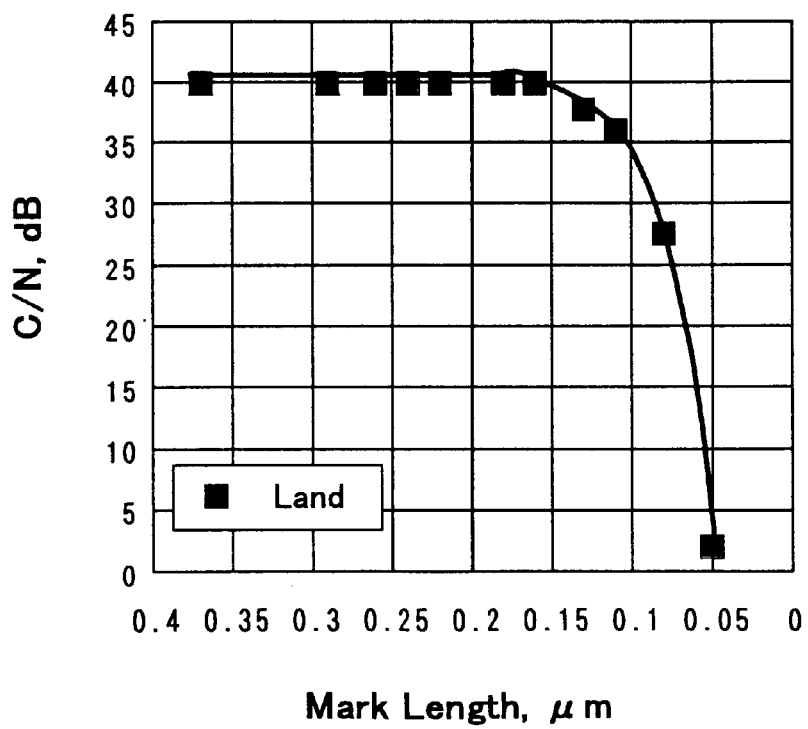
FIG. 21 is a graph showing a mark length vs C/N reproduction frequency characteristic on a land recording of an information recording disc in the present invention.

FIG. 21 is a graph showing a mark length vs C/N reproduction frequency characteristic on a land recording of an information recording disc in the present invention, and FIG. 22 is a graph showing a mark length vs C/N reproduction frequency characteristic on a groove recording of an information recording disc in the present invention.

Next, an information signal was recorded/reproduced on/from the information recording medium by irradiating and focusing a laser beam on the lands 2 thereof. As a result, a mark length vs C/N reproduction frequency characteristic was obtained as shown in FIG. 21. In the recording apparatus used here, a laser beam having a wavelength of 690 nm and an objective lens having a numerical aperture of 0.6 were employed, and a single frequency recording/reproducing was carried out. The recording power was 3.7 mW and the reproducing power was 2.0 mW. At that time, it has been confirmed that the recording of a mark length of 0.06 μm was attained, resulting in a development of the super-resolution phenomenon. The C/N at a mark length of 0.1 μm was 36 dB which is enough for a practical use. Incidentally, the reproducing limitation obtained from a theoretical calculation using the wavelength and the numerical aperture is a mark length of 0.26 μm.

Next, the recording/reproducing was carried out by irradiating and focusing a laser beam on the groove 3 of the information recording disc, resulting in a mark length vs C/N reproducing frequency characteristics as shown in FIG. 22. In this case, it was confirmed that the shortest mark length of 0.08 μm was attained, resulting in a development of the super-resolution phenomenon. The C/N at a mark length of 0.1 μm was 35 dB which is enough for a practical use.

As seen from FIGS. 21, 22, it was confirmed that the land/groove recording was attained even when the plastic supporter was employed as the supporter 1B.

Next, the recording/reproducing of 1, 7 modulation signal was carried out by focusing a laser beam on the land 2. In the 1, 7 modulation signal recording, signals having various kinds of mark lengths from 2T to 8T are recorded at random. When the shortest mark length (2T) was set to be 0.12 μm, the jitter of reproducing was 9.1%. This value of the jitter was enough for the practical use. Incidentally, the jitter was measured on the basis of Japanese Industrial Standard "120 mm DVD-Read-only disk" (JIS-X-6241: 1997 Annex F). The limitation of the reproduction obtained from a theoretical calculation using the wavelength and the numeral aperture is a mark length of 0.26 μm. Thus, it was confirmed that the super-resolution phenomenon was developed.

Next, a recording/reproducing was carried out in the same manner as mentioned above by focusing the laser beam on the groove 3. When the shortest mark length (2T) was made to be 0.12 μm, the jitter of reproducing was 9.5%. This value of the jitter was enough for the practical use. As mentioned above, it has been confirmed that the land/groove recording was attained even when the random signal was employed.

[Embodiment 4]

Next, a description is given of an information medium of a fourth embodiment in the present invention, wherein a plastic supporter is employed as the supporter 1, and a phase change recording layer is employed as the recording layer 5. Further, in such a phase change recording layer as typically seen in the DVD-RAM where a land width is 0.74 μm and a groove width is 0.74 μm, thus, the track pitch is 1.48 μm, resulting in a recording capacity of 2.6 GB, the land/groove recording has been already put into practice. However, it was impossible to realize a larger recording capacity than that by decreasing the track pitch, because of a cross-erase phenomenon erasing adjacent tracks on recording.

On the other hand, according to the present invention, it is possible to decrease the track pitch by employ the supporter having crevices because of a decrease of the cross-erase phenomenon, resulting in a realization of a further higher recording density.

FIG. 23 is a chart showing concrete dimensions of the surface shape of the supporter in an embodiment of the present invention, and FIG. 24 is a section of other recording layer for explaining a concrete laminated structure of the recording layer in the present invention.

Here, the plastic supporter 1B is manufactured in the same manner as mentioned in the Embodiment 3, however, manufacturing conditions are slightly changed. The plastic supporter 1B is made of polycarbonate having a diameter of 120 mm and a thickness of 0.6 mm. Further, the surface shape thereof satisfies the dimensions shown in FIG. 23. Specifically, the width W1 of the land 2 is 0.51 μm and in the width (Wg+2Wc) of the groove 3, Wg is 0.51 μm, the depth Dg of the groove 3 is 0.06 μm and the width Wc of the crevice 4 is 0.04 μm and the depth Dc of the crevice 4 is 0.1 μm. Thus, a track pitch is 1.1 μm.

Next, on the supporter 1B, the recording layer 5 and the protection layer 6 were formed. The recording layer 5 was formed so as to have a structure shown in FIG. 24 by a well known sputtering method. Specifically, the recording layer 5 was formed by sandwiching a phase change recording layer 5e1 of GeSbTeN, which has the same construction as that of the DVD-RAM, between dielectric layers 5f1, 5f2 of ZnS SiO. Further, a reflecting layer 5g1 of AlCr was formed on the dielectric layer 5f2.

Next, as the protection layer 6, an ultraviolet ray curing resin was coated at a thickness of 4 μm by a well known spray method, and cured by irradiating ultraviolet rays A+B wave. This information recording disc was vertically cut to the tracks, and the section of the disc was observed by using the scanning electron microscope, resulting in the sectional shape shown in FIG. 4. Two sheets of these discs were adhered with an adhesive by causing the protection layers 6 thereof to face to each other (not shown). Further, as the adhesive layer formed therebetween, a slow curing cationic ultraviolet ray resin was used. Then, after initializing the information recording disc, an information signal was recorded/reproduced on/from the information recording disc.

The used recording apparatus had a laser beam having a wavelength of 650 nm, and an objective lens having a numeral aperture of 0.6. The recording power was 11 mW, the erasing power was 4.5 mW and the reproducing power was 1 mW. As the recording signal, 8–16 modulation random signal was used, wherein 3T as the shortest mark length was made to be 0.6 μm.

FIG. 25 is a chart showing measurement values of jitter on the land/groove recording of the information recording medium in the present invention.

First, continuously unrecorded three tracks were chosen, and the respective unrecorded tracks were named as a track a, track b and a track c. Then, an 8–16 random recording signal was recorded on the middle track b among them, and the recorded signal was successively reproduced from the track b and the jitter (J1) thereof was measured. Successively, the recording signal was recorded on the adjacent track a, and the jitter (J2) of the track b was measured. Further, the recording signal was recorded on the other adjacent track c, and the jitter (J3) of the track b was measured. These measurements of the jitter for the track b were repeated three times with respect to the land 2 and the groove 3, respectively. The results are shown in FIG. 25.

As the adjacent track of the track b is recorded, the value of jitter for the track b is increasing gradually, however, the increased value thereof is at most 0.6%, and the cross-erase was scarcely acknowledged. According to the 2.6 GB DVD-RAM Standard, a specific value of the jitter is determined to be not more than 8.5%. Thus, it will be understood that the values of jitter obtained from the experiments satisfy the specific values of the standard. This means that it is possible to shorten the track pitch from 1.48 to 1.1 μm, resulting in that the recording density of the information recording medium of this embodiment is increased 1.4 times as high as that of the conventional recording density.

[Comparative]

Figure 6:
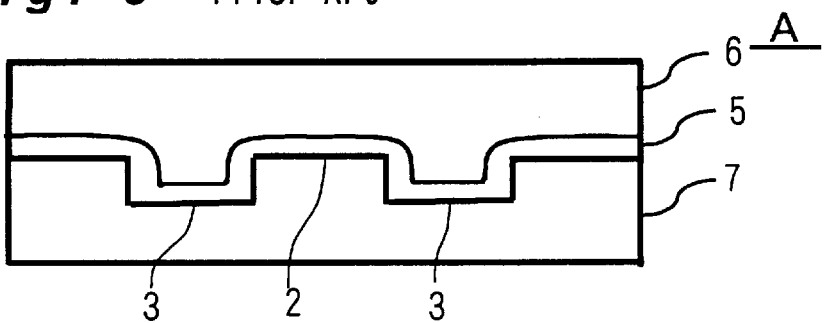
FIG. 6 is a schematic sectional view of an information recording medium employing the supporter shown in FIG. 5 in the prior art.

For comparison, the conventional disc shown in FIG. 6 was prepared, and the recording/reproducing characteristics thereof were measured in the same manner as mentioned in the foregoing. Here, the supporter 7 has the construction shown in FIG. 5, and is made of polycarbonate. The width of the land 3 is made to be 0.51 μm and the width of groove 3 is made to be 0.59 μm. Thus, the track pitch thereof is made to be 1.1 μm which is the same as that of the embodiment 4.

FIG. 26 is a chart showing measurement values of jitter on the land/groove recording in the prior art.

The resultant measurement values of the jitter are shown in FIG. 26. As seen from FIG. 26, as the adjacent tracks are being recorded, the jitter of the middle track b is remarkably increasing, and shows a maximal increase amount of nearly 17%. In this case, a remarkable cross-erase has been developed. This means that it is impossible to shorten the track pitch when the conventional supporter is employed in the information recording medium.

As seen from the above description, the supporter having the crevices shows effective results in the jitter and the cross-erase problems even when it is employed for the phase change type recording disc. This reason is considered that the recording layer 5 is cut at every recording track by the crevice as shown in FIG. 4. Thus, the crevices contributes to prevent heat which is generated by irradiating the laser beam on the adjacent recording tracks upon its recording, from transmitting to the corresponding track, resulting in a prevention of the cross-erase on the corresponding track.

In summary, according to the supporter used for an information recording medium in the present invention, lands and grooves are alternately formed as a minute track pattern on the supporter, and there is provided a crevice having a depth larger than that of the crevices in the respective grooves at one end thereof. Further, the information recording medium of the present invention is provided with a recording layer corresponding to a high density recording thereon, and the recording layer is cut at every recording track by the crevice. Thus, in the DWDD type super-resolution recording, it is possible to perform recording/reproducing without the laser annealing. This fact contributes to effectively produce such an information recording medium as having a high recording density in mass production.

Further, according to another supporter used for an information recording medium in the present invention, lands and grooves are alternately formed as a minute track pattern on the supporter, and there are provided two crevices in one groove, each having a depth larger than that of the respective grooves, at both ends of the respective grooves. Further, the information recording medium of the present invention has a recording layer corresponding to a high density recording thereon, and the recording layer is cut at every recording track by the crevice. Thus, it is possible to record an information recording signal without an reverse effect from the adjacent tracks, resulting in a realization of a further high density recording and a effective mass production of the information recording mediums.

Furthermore, according to a manufacture method of the supporter mentioned above, it is possible to produce the supporter in high precision.

Further, according to a manufacture apparatus and a stamper used for producing the supporter in the present invention, it is possible to simultaneously form or bore the grooves and the crevices in the supporter in high precision.

What is claimed is:

1. An information recording medium for recording an information signal thereon comprising:
- a supporter on which lands and grooves are alternately formed as a minute track pattern, the lands and the grooves being flat and parallel to each other;
- a crevice formed in the respective grooves on said supporter, the crevice having a sharp and pointed V-letter ditch extending to a depth larger than that of the respective grooves; and
- a recording layer formed on the supporter except for said V-letter ditch of said crevice, such that said recording layer is divided into a plurality of spaced apart recording areas.

2. The information recording medium as claimed in claim 1, wherein the crevice is formed nearby an end of the respective grooves in a width direction of the respective grooves.

3. The information recording medium as claimed in claim 1, wherein the recording layer is cut at every track of the minute track pattern.

4. The information recording medium as claimed in claim 1, wherein the recording layer includes, at least, a magneto-optical layer with magnetic super resolution.

5. The information recording medium as claimed in claim 4, wherein the magneto-optical layer with magnetic super resolution is made of a domain wall displacement detection type information recording medium.

6. The information recording medium as claimed in claim 1 wherein the-recording layer includes, at least, a phase change recording layer.

7. An information recording medium for a recording information recording signal thereon comprising:
- a supporter on which lands and grooves are alternately formed as a minute track pattern, the lands and the grooves being flat and parallel to each other;
- two crevices formed in the respective grooves nearby both ends of the respective grooves in a width direction of the respective grooves on said supporter, with each of the two crevices having a sharp and pointed V-letter ditch extending to a depth larger than that of the respective grooves; and
- a recording layer formed on the supporter except for said V-letter ditch of said crevices, such that the recording layer is divided into a plurality of spaced apart recording areas.

8. The information recording medium as claimed in claim 7, wherein the recording layer is cut at every track of the minute track pattern.

9. The information recording medium as claimed in claim 7, wherein the recording layer includes, at least, a magneto-optical layer with magnetic super resolution.

10. The information recording medium as claimed in claim 9, wherein the magneto-optical layer with magnetic super-resolution is made of a domain wall displacement detection type information recording medium.

11. The information recording medium as claimed in claim 7, wherein the recording layer includes, at least, a phase change recording layer.

12. A supporter used for forming a recording layer of an information recording medium thereof, wherein lands and grooves are alternately formed in the supporter as a minute track pattern, the lands and the grooves being flat and parallel to each other, and a crevice formed in the respective grooves having a sharp and pointed V-letter ditch extending to a depth larger than that of the respective grooves to cut the recording layer; and
- a recording layer formed on the supporter except for each V-letter ditch in said crevices, such that the recording layer is divided into a plurality of spaced apart recording areas.

13. The supporter as claimed in claim 12, wherein the crevice is formed nearby an end of the respective grooves in a width direction of the respective grooves.

14. A supporter used for forming a recording layer of an information recording medium thereof, wherein lands and grooves are alternately formed in the supporter as a minute track pattern, the lands and the grooves being flat and parallel to each other, and two crevice each having a sharp and pointed V-letter ditch extending to a depth larger than that of the respective grooves formed in the respective grooves nearby both ends thereof in a width direction of the respective grooves to cut the recording layer;
- a recording layer formed on the supporter except for said V-letter ditch of said crevices, such that the recording layer is divided into a plurality of spaced apart recording areas.

* * * * *